US008285478B2

(12) United States Patent
Subelet

(10) Patent No.: US 8,285,478 B2
(45) Date of Patent: Oct. 9, 2012

(54) METHOD FOR OPTIMIZING THE DISPLAY OF DATA RELATING TO THE RISKS PRESENTED BY OBSTACLES

(75) Inventor: Michel Subelet, Cugnaux (FR)

(73) Assignee: Thales, Neuilly-sur-Seine (FR)

( * ) Notice: Subject to any disclaimer, the term of this patent is extended or adjusted under 35 U.S.C. 154(b) by 1102 days.

(21) Appl. No.: 12/093,155

(22) PCT Filed: Nov. 6, 2006

(86) PCT No.: PCT/EP2006/068129

§ 371 (c)(1),
(2), (4) Date: May 9, 2008

(87) PCT Pub. No.: WO2007/054481

PCT Pub. Date: May 18, 2007

(65) Prior Publication Data

US 2008/0281522 A1 Nov. 13, 2008

(30) Foreign Application Priority Data

Nov. 10, 2005 (FR) ..................................... 05 11461

(51) Int. Cl.
*G06F 17/10* (2006.01)
*G06G 7/78* (2006.01)
*G06G 1/16* (2006.01)

(52) U.S. Cl. ....................................................... 701/301

(58) Field of Classification Search .................. 701/1, 3, 701/8–10, 14, 301; 244/75.1; 340/945–946
See application file for complete search history.

(56) References Cited

U.S. PATENT DOCUMENTS

| | | | | |
|---|---|---|---|---|
| 5,892,462 | A * | 4/1999 | Tran | 340/961 |
| 5,936,552 | A * | 8/1999 | Wichgers et al. | 340/963 |
| 6,021,374 | A * | 2/2000 | Wood | 701/301 |
| 6,088,634 | A * | 7/2000 | Muller et al. | 701/9 |
| 6,138,060 | A * | 10/2000 | Conner et al. | 701/9 |
| 6,157,891 | A * | 12/2000 | Lin | 701/301 |
| 6,219,592 | B1 * | 4/2001 | Muller et al. | 701/9 |
| 6,292,721 | B1 * | 9/2001 | Conner et al. | 701/9 |
| 6,480,789 | B2 * | 11/2002 | Lin | 701/301 |
| 6,484,072 | B1 * | 11/2002 | Anderson et al. | 701/9 |
| 6,583,733 | B2 * | 6/2003 | Ishihara et al. | 340/946 |
| 6,606,034 | B1 * | 8/2003 | Muller et al. | 340/970 |

(Continued)

FOREIGN PATENT DOCUMENTS

FR 2867559 A1 9/2005

(Continued)

*Primary Examiner* — Khoi Tran
*Assistant Examiner* — Harry Oh
(74) *Attorney, Agent, or Firm* — Lowe, Hauptman, Ham & Berner, LLP

(57) ABSTRACT

The invention relates to a method for optimizing the display of data relating to the risks associated with obstacles. The method includes extracting from an obstacle database, a list of obstacles included in the geographic zone defined by the range, the orientation and the position of the aircraft. Obstacle related information and warning lists are received. The obstacle list is regrouped by applying to the obstacles criteria relating to the proximity of the obstacles relative to the aircraft; to the proximity of the obstacles to one another; and to their warning level. The symbology adapted to the obstacle display is generated. In particular, the invention applies to optimizing the display of warnings relating to the risks of collision with point-like or linear obstacles.

18 Claims, 3 Drawing Sheets

U.S. PATENT DOCUMENTS

| | | | | |
|---|---|---|---|---|
| 6,707,394 | B2 * | 3/2004 | Ishihara et al. | 340/970 |
| 6,710,723 | B2 * | 3/2004 | Muller et al. | 340/970 |
| 6,833,797 | B2 * | 12/2004 | Ishihara | 340/946 |
| 6,906,641 | B2 * | 6/2005 | Ishihara | 340/946 |
| 7,233,859 | B2 * | 6/2007 | Lundberg | 701/200 |
| 7,580,776 | B1 * | 8/2009 | McCusker et al. | 701/3 |
| 2002/0099478 | A1 * | 7/2002 | Ishihara et al. | 701/9 |
| 2003/0107499 | A1 * | 6/2003 | Lepere et al. | 340/945 |
| 2004/0068372 | A1 * | 4/2004 | Ybarra et al. | 701/301 |

FOREIGN PATENT DOCUMENTS

| | | | |
|---|---|---|---|
| WO | 02/059547 | A2 | 8/2002 |

* cited by examiner

METHOD FOR OPTIMIZING THE DISPLAY OF DATA RELATING TO THE RISKS PRESENTED BY OBSTACLES

CROSS-REFERENCE TO RELATED APPLICATIONS

The present Application is based on International Application No. PCT/EP2006/068129, filed on Nov. 6, 2006, which in turn corresponds to French Application No. 05 11461 filed on Nov. 10, 2005, and priority is hereby claimed under 35 USC §119 based on these applications. Each of these applications are hereby incorporated by reference in their entirety into the present application.

FIELD OF THE INVENTION

The invention relates notably to a method for optimizing the display of data relating to the risks associated with obstacles. In particular, the invention applies to the optimization of the display of warnings relating to the risks of collision with point-like or linear obstacles by taking account of the trajectory of the aircraft and of the altitude of the obstacles.

BACKGROUND OF THE INVENTION

Amongst the risks which an aircraft must be able to face, there is a category of accidents known as accidents with impact without loss of control (or Controlled Flight Into Terrain CFIT). This category includes accidents during which an aircraft that can be flown under the control of its crew unintentionally collides with terrain, obstacles or a stretch of water without the crew being aware of the imminence of the collision.

To limit the risk associated with controlled flight into terrain accidents, new supervision instruments have been developed. Notably it is possible to cite the Terrain Awareness and Warning System. A terrain awareness and warning system may notably comprise a display device to warn the aircraft crew of the possible risks associated with the terrain. Usually, the various zones of the terrain overflown are displayed with a color code on a navigation screen. The zones presenting no particular risks for the aircraft are displayed in black, the zones presenting a low risk in green, the zones presenting a medium risk in yellow and the zones presenting a high risk in red.

The terrain awareness and warning systems may also be supplemented by a function for predicting collisions with obstacles, such as for example man-made obstacles of the electric line type or else of the very high building type. The aircraft crew must therefore have a means for being aware of the obstacles present in the environment of the aircraft in addition to information on the corresponding terrain. Warnings of different levels are able to be generated for each obstacle presenting a risk for the aircraft by the obstacle collision prediction function. These warnings must therefore also be able to be communicated to the crew by a given interface.

However, it is essential to optimize the number and pertinence of the information transmitted to the aircraft crew. This is particularly true for the obstacle-related information and warnings. Specifically, the number of obstacles in certain geographic zones is potentially high. It is therefore of no use and even dangerous to swamp the crew with items of information that are redundant and/or unusable because they are too numerous.

SUMMARY OF THE INVENTION

The object of the invention is notably to remedy the aforementioned disadvantages. Accordingly, the subject of the invention is a method for optimizing the obstacle-related data display receiving the information necessary to define the zone comprising the obstacles to be displayed. The method comprises the following steps:

- extracting, from an obstacle database, a list of obstacles included in the geographic zone defined by the range, the orientation and the position of the aircraft;
- receiving an information list and an obstacle-related warning list generated by an obstacle collision prediction and warning device;
- filtering and regrouping the obstacles of the obstacle list by applying to the obstacles criteria relating:
  - to the proximity of the obstacles relative to the aircraft;
  - to the proximity of the obstacles to one another;
  - to their warning level;
- generating the symbology adapted to the obstacle display.

In one embodiment, the step of filtering and regrouping comprises a step of filtering the obstacles according to elevation in which a list of obstacles filtered according to their elevation is constructed with all the obstacles present in the obstacle list whose elevation is less than a display threshold received among the information. The filtering and regrouping step may notably comprise a filtering step. Said filtering step comprises, for example, the following steps:

- a step of initializing a variable n at the value of the smallest possible position of an obstacle in the list of obstacles filtered according to their elevation;
- a step of extracting the obstacle O(n) whose position in the list of obstacles filtered according to their elevation is equal to n;
- a step of initializing a variable p, fixed at one unit;
- a step of extracting the obstacle O(n+p) whose position in the list of obstacles filtered according to their elevation is equal to n+p.
- a step of comparing the distance d(O(n),O(n+p)) between the obstacle O(n) and the obstacle O(n+p) with the minimum distance D:
  - if the distance d(O(n),O(n+p)) is greater than or equal to the minimum distance D, there is a move to a step of incrementing the index p by a unit;
  - if the distance d(O(n),O(n+p)) is less than the minimum distance D, there is a move to a step of searching;
- the step of searching in the list of warnings for the warning level A(O(n)) relating to the obstacle O(n) and for the warning level A(O(n+p)) relating to the obstacle O(n+p):
  - if the warning level A(O(n)) is greater than the warning level A(O(n+p)), there is a move to a step of removing the obstacle O(n+p);
  - if the warning level A(O(n)) is less than the warning level O(n+p), there is a move to a step of removing the obstacle O(n);
  - if the warning level A(O(n)) is equal to the warning level A(O(n+p)), there is a move to a step of comparing;
- the step of comparing the horizontal distance d(O(n)) of the obstacle O(n) relative to the aircraft and the horizontal distance d(O(n+p)) of the obstacle O(n+p) relative to the aircraft:
  - if the horizontal distance d(O(n)) is greater than the horizontal distance d(O(n+p)), there is a move to a step of removing the obstacle O(n);

if the horizontal distance d(O(n)) is less than the horizontal distance d(O(n+p)), there is a move to a step of removing the obstacle O(n+p);

the step of removing the obstacle O(n+p) from the filtered obstacle list, the step being followed by the step of incrementing the index p;

the step of removing the obstacle O(n) from the filtered obstacle list, the step being followed by a step of incrementing the variable n;

the step of incrementing the variable n by a unit, the step being followed by a step of verifying the existence of the obstacle O(n);

the step of verifying the existence of the obstacle O(n) exists in the list of obstacles filtered according to their elevation:

if the obstacle O(n) exists, there is again a move to the step of initializing a variable p;

if the obstacle O(n) does not exist, there is a move to a step marking the end of the method of filtering according to the proximity of the obstacles;

The filtered obstacle list in the state in which it exists in the step of verifying the existence of the obstacle O(n) is transmitted as a filtered obstacle list. The minimum distance D between two obstacles displayed is computed by dividing the maximum range relative to the aircraft from the data to be displayed by a coefficient k. After the step (22), a test step (24) may be inserted verifying whether the absolute value of the difference between the latitude of the obstacle O(n+p) and the latitude of the obstacle O(n) is less than a minimum distance D:

if it is, there is then a move to the step for comparing the distance d(O(n),O(n+p));

if it is not, there is a move to the step for incrementing the index p.

Advantageously, the step of generating the symbology adapted to the display of the obstacles comprises:

a step for processing the display of the obstacle-related warnings, the linear obstacles included in the filtered obstacle list being processed as a list of point-like obstacles, the extremities of the point-like obstacles with which warnings are associated being processed as point-like obstacles having a warning of the same level as the linear obstacle, the obstacle being displayed in the same color as the corresponding terrain warning;

a step for processing the display of the obstacle representation, a different symbol being attached depending on whether the obstacle is multiple or not.

The notable advantages of the invention are that it ensures a safe vertical separation of the obstacles, particularly during the landing phases, thereby ensuring that the crew has a good awareness of the situation. The invention may also include a terrain awareness and warning system.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
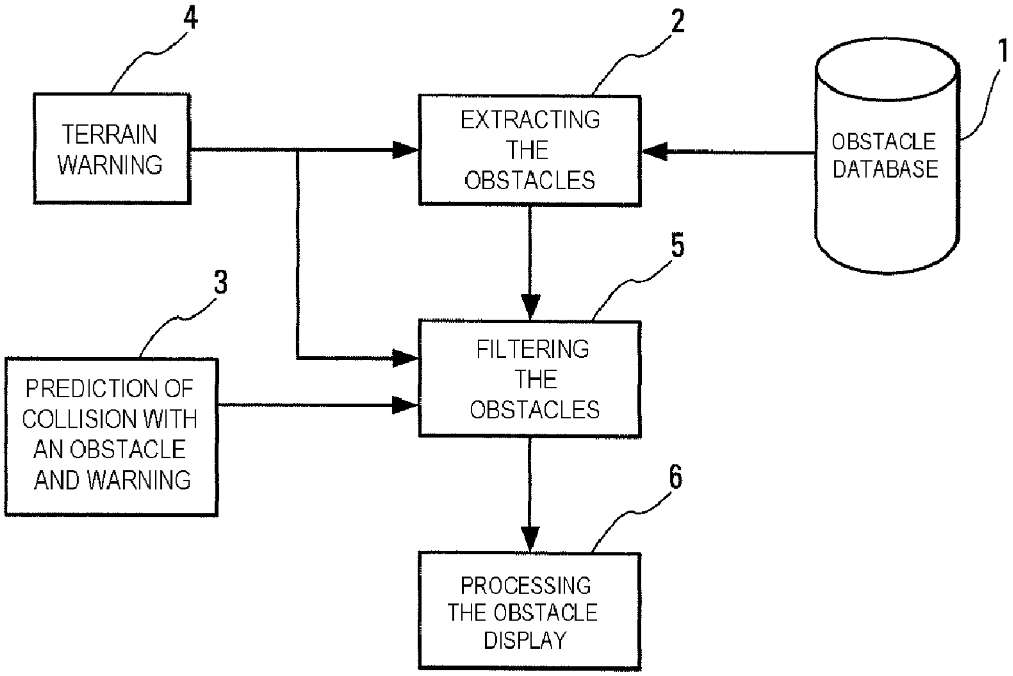
FIG. 1, an obstacle information and warning filtering and display system according to the invention.

FIG. 1 illustrates an obstacle information and warning filtering and display system according to the invention.

A Terrain Awareness and Warning System is an instrument that can be fitted on board an aircraft. It notably comprises an onboard topographical database on the relief of the terrains. A topographical database of the obstacles may notably supplement the existing data included in the topographical database on the relief of the terrains. An obstacle may be called a point-like obstacle if the latter is restricted to a limited geographic zone. A point-like obstacle may be described notably by its latitude, its longitude and its height, for example a height expressed Above mean sea level height. The accuracy of each of its coordinates and where necessary its horizontal extension can be added to this. An area of uncertainty corresponds to a disk centered on a point-like obstacle with a radius equal to the value of the uncertainty as to the longitude and latitude coordinates of the obstacle. An obstacle may also be called a linear obstacle if the latter extends over a considerable geographic zone. A linear obstacle may be represented by a list of point-like obstacles. The extremities of a linear obstacle may be represented by point-like obstacles.

In FIG. 1, the obstacle information and warning filtering and display system according to the invention notably comprises an obstacle extraction device 2, an obstacle filtering device 5 and an obstacle information and warning display processing device 6. The obstacle information and warning filtering and display system according to the invention may be coupled with:

a terrain warning device 4, usually included in the terrain awareness and warning system;

an obstacle database 1;

an obstacle collision prediction and warning device 3.

The terrain warning device 4 supplies the obstacle extraction device 2 with a range and an orientation defining the zone comprising the obstacles to be displayed. This range is for example the range selected by the crew for the navigation screen on which the obstacle-related data must be displayed. This navigation screen may notably be included in the terrain warning device 4. The obstacle extraction device 2 extracts from the obstacle database 1 the list of obstacles included in the geographic zone defined by the range, the orientation and the position of the aircraft. The obstacle information and warning filtering and display system according to the invention may notably manage several display devices as an output. Also, an obstacle list is extracted by the obstacle extraction device 4, for each display device managed, with parameters of range and orientation specific to each one.

The obstacle filtering device 5 receives the obstacle list extracted by the obstacle extraction device 2. The obstacle filtering device 5 also receives from the terrain warning device 4 a display threshold corresponding to the minimum elevation below which the terrain-related or obstacle-related information must not be displayed. The obstacle filtering device 5 also receives from the obstacle collision prediction and warning device 3 a list of obstacle-related warnings. The obstacle filtering device 5 filters the obstacle list extracted by the obstacle extraction device 2:

- according to the elevation of the obstacles with respect to the display threshold;
- according to the proximity of the obstacles and their warning level.

The obstacle filtering device 5 generates an obstacle list to be displayed.

The obstacle display processing device 6 receives the obstacle list to be displayed from the obstacle filtering device 5. Depending on the obstacle-related parameters, the obstacle display processing device 6 notably has the function of generating the appropriate symbology.

Figure 2:
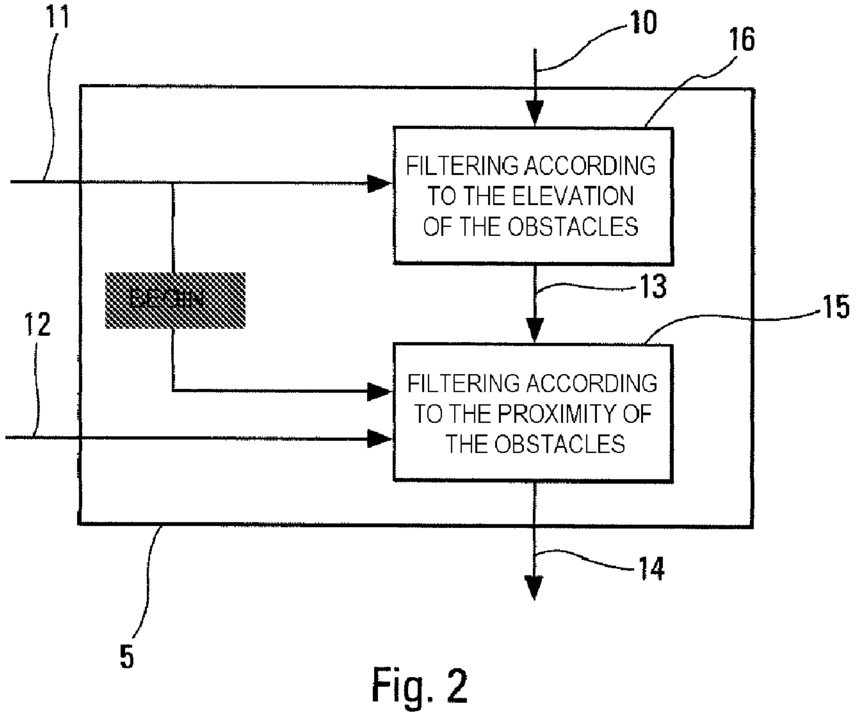
FIG. 2, an obstacle filtering method according to the invention, able to be used in the obstacle filtering device according to the invention.

FIG. 2 illustrates an obstacle filtering method, according to the invention, that can be used in the obstacle filtering device according to the invention. The elements identical to the elements already presented carry the same reference numbers.

The obstacle filtering method according to the invention receives an obstacle list 10. This obstacle list 10 may notably be supplied by an obstacle extraction device 2. The obstacle filtering method also receives from a terrain warning device 4 information 11 comprising notably the display threshold corresponding to the minimum elevation below which the terrain-related or obstacle-related information must not be displayed. The obstacle filtering device 5 also receives an obstacle warning list 12 from the obstacle collision prediction and warning device 3. The obstacle collision prediction and warning device 3 may generate warnings according to:

- the level of risk of the situation in which the aircraft is and
- a Minimum Obstacle Clearance Distance defined as the vertical safe distance between the aircraft and an obstacle. This distance is notably chosen according to the features of the aircraft and the standards in force.

The warnings generated may for example be divided into three categories:

- Obstacle Caution;
- Obstacle Warning;
- Avoid Obstacle.

The obstacle filtering method according to the invention notably comprises a step 16 of filtering obstacles according to elevation. A list of obstacles filtered according to their elevation 13 is constructed with all the obstacles present in the obstacle list 10 whose elevation is below the display threshold received in the information 11. The elevation may notably be expressed as Above mean sea level height.

The list of obstacles filtered according to their elevation 13 is then transmitted to a step 15 of filtering according to the proximity of the obstacles. When several obstacles are too close to one another to be displayed correctly and distinctly, it is worthwhile to display only one obstacle called a multiple obstacle identified as such. The object of the step 15 is therefore notably to produce a filtered obstacle list 14 as an output comprising obstacles and multiple obstacles when necessary.

Figure 3:
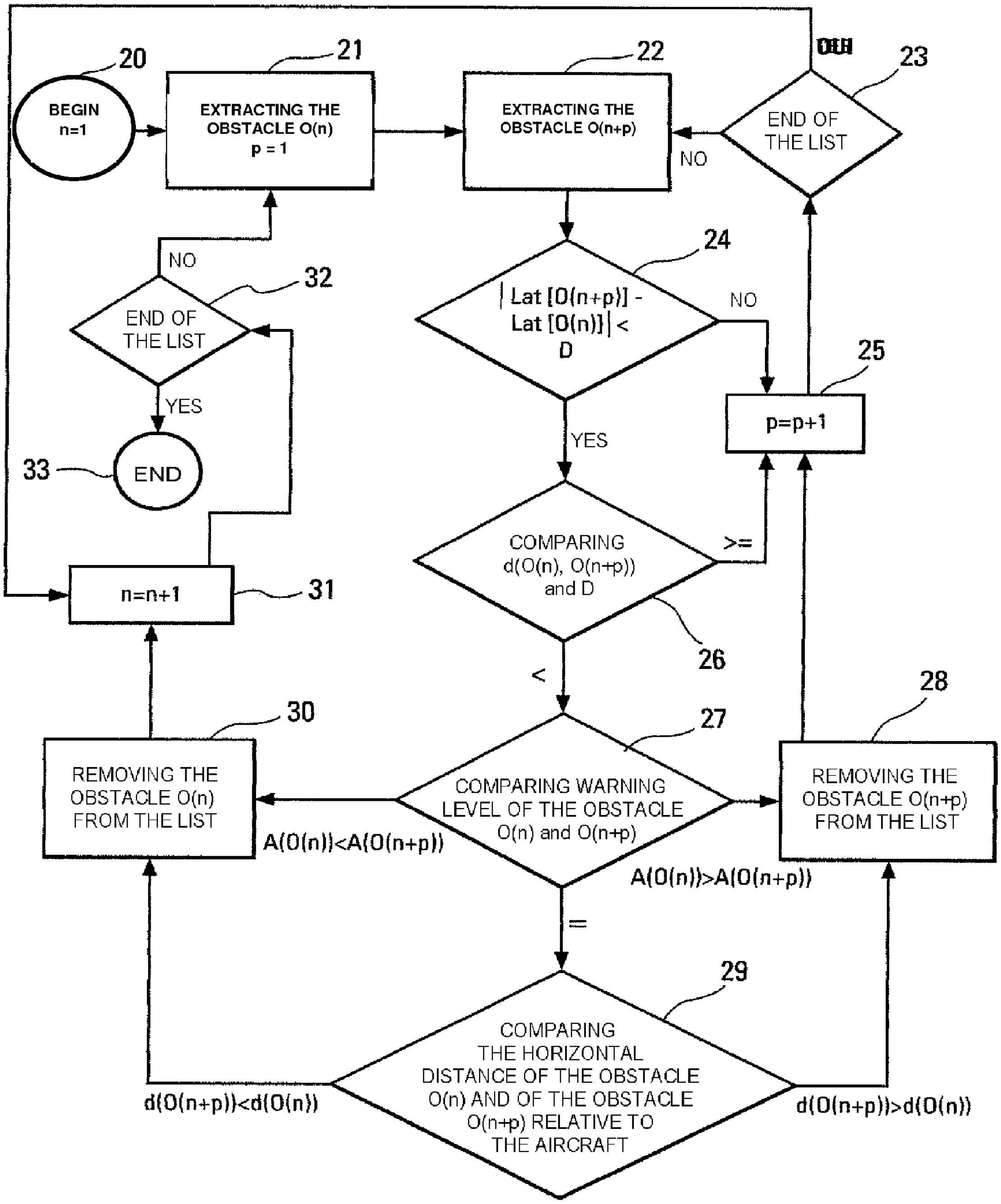
FIG. 3, a method according to the invention for filtering according to the proximity of the obstacles.

FIG. 3 shows a method according to the invention for filtering according to the proximity of the obstacles. This filtering method may notably be used in step 15 of the obstacle filtering method described in FIG. 2. The elements identical to the elements already presented carry the same reference numbers.

Amongst the parameters used by the method for filtering according to the proximity of the obstacles there is a minimum distance D between two displayed obstacles. The minimum distance D may also be computed by dividing the display range by a coefficient k. The coefficient k may for example be chosen to be equal to 40, or may take any other value according to the display desired.

The method for filtering according to the proximity of the obstacles begins at a step 20 where the variable n is set at 1 (or 0 if the first index of the list of obstacles filtered according to their elevation 13 is equal to 0). In a step 21, the obstacle marked O(n) (that is to say the obstacle whose position in the list of obstacles filtered according to their elevation 13 is equal to n) is extracted from the list of obstacles filtered according to their elevation 13 and the variable p is set to 1. In a step 22, an obstacle marked O(n+p), whose position in the list of obstacles filtered according to their elevation 13 is equal to n+p, is extracted.

A test 24 is intended to verify whether the absolute value of the difference between the latitude of the obstacle O(n+p) and the latitude of the obstacle O(n) is less than the minimum distance D:

- if it is not the case, the index p is incremented by 1 in a step 25; then, in a step 23, it is verified whether the obstacle O(n+p) exists in the list of obstacles filtered according to their elevation 13. If the obstacle O(n+p) exists, there is again a move to the step 22. If the obstacle O(n+p) does not exist, there is a move to a step 31 described below.
- If it is the case, there is a move to a step 26.

The test step 24 makes it possible to optimize the performance of the method for filtering according to the proximity of the obstacles. However, in one embodiment, the test step 24 may be removed. In this case, the step 22 is therefore followed by the step 26.

The step 26 compares the distance d(O(n),O(n+p)) between the obstacle O(n) and the obstacle O(n+p) with the minimum distance D. If the distance d(O(n),O(n+p)) is greater than (or even equal to) the minimum distance D, there is a move to the step 25. If the distance d(O(n),O(n+p)) is less than the minimum distance D, there is a move to the step 27.

The step 27 looks in the warning list 12 for the warning level relating to the obstacle O(n) and the obstacle O(n+p). The warning level of the obstacle O(n) is marked A(O(n)). The warning level of the obstacle O(n+p) is marked A(O(n+p)). If the warning level relating to the obstacle O(n) is higher than the warning level relating to the obstacle O(n+p), there is a move to a step 28. If the warning level relating to the obstacle O(n) is lower than the warning level relative to the obstacle O(n+p), there is a move to a step 30. If the warning level relating to the obstacle O(n) is equal to the warning level relating to the obstacle O(n+p), there is a move to a step 29.

The step 29 compares the horizontal distance d(O(n)) relative to the aircraft of the obstacle O(n) and the horizontal distance d(O(n+p)) relative to the aircraft of the obstacle O(n+p). If the horizontal distance d(O(n)) is greater than the horizontal distance d(O(n+p)), there is a move to the step 30. If the horizontal distance d(O(n)) is less than the horizontal distance d(O(n+p)), there is a move to the step 28.

The step 28 removes the obstacle O(n+p) from the filtered obstacle list 13. The step 28 is followed by the step 25.

The step 30 removes the obstacle O(n) from the filtered obstacle list 13. The step 30 is followed by a step 31.

The step 31 increments the variable n by 1. The step 31 is followed by the step 32.

The step 32 verifies whether the obstacle O(n) exists in the list of obstacles filtered according to their elevation 13. If the obstacle O(n) exists, there is again a move to the step 21. If the obstacle O(n) does not exist, there is a move to the step 33 marking the end of the method for filtering according to the proximity of the obstacles. The filtered obstacle list in the state in which it exists in step 32 is transmitted as the filtered obstacle list 14.

Figure 4:
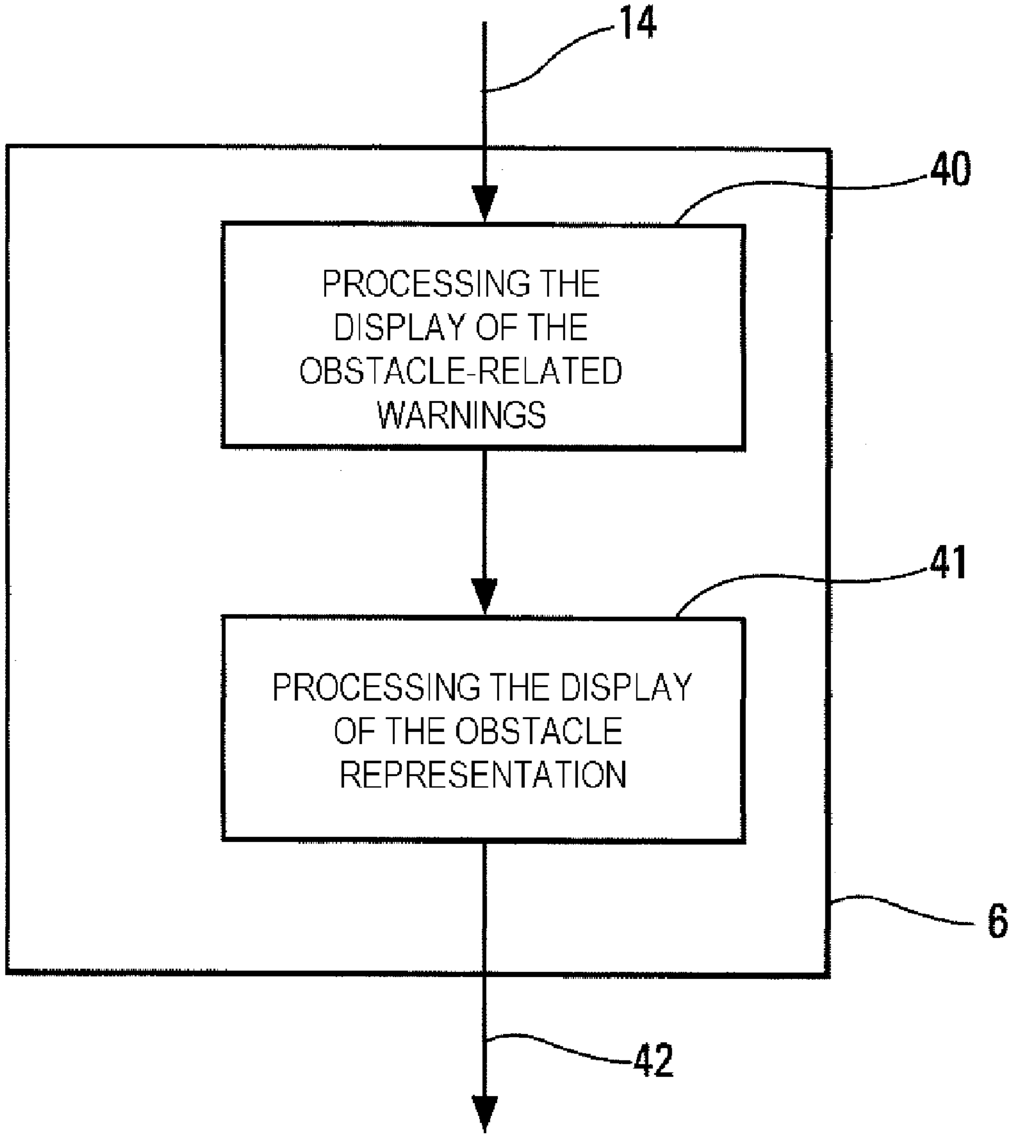
FIG. 4, a method for obstacle display processing according to the invention, being able to be used in the obstacle processing device according to the invention.

FIG. 4 illustrates an obstacle display processing method 6 according to the invention, that may be used in the obstacle processing device according to the invention. The elements identical to the elements already presented carry the same reference numbers.

The filtered obstacle list 14 originating from a method for filtering according to the proximity of the obstacles is received as an input of a step 40 of processing the display of the obstacle-related warnings. The linear obstacles included in the filtered obstacle list 14 are processed as a point-like obstacle list. If a warning is associated with a linear obstacle, the point-like obstacles representing the extremities of said linear obstacles are processed as point-like obstacles having a warning of the same level as the linear obstacle. When an obstacle from the filtered obstacle list 14 has an associated warning, the step 40 of processing the display of obstacle-related warnings ensures that the obstacle is displayed in the same color as the corresponding terrain warning. When an obstacle from the filtered obstacle list 14 has no associated warning, the step 40 of processing the display of obstacle-related warnings ensures that the obstacle is displayed in the same color as the corresponding terrain.

In a step 41 of processing the display of the obstacle representation, a different symbol is attached depending on whether the obstacle is multiple or not. For example, a multiple obstacle may be represented by a symbol comprising several colored triangles in perspective whereas the other obstacles may be represented by a colored triangle.

As an output 42, the symbols to be displayed are sent to the various navigation screens. The output 42 may notably comply with the Arinc708 protocol.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for optimizing an obstacle-related data display receiving information necessary to define a zone comprising the obstacles to be displayed, comprising the following steps:
- extracting from an obstacle database, a list of obstacles included in a geographic zone defined by a range, the orientation and a position of an aircraft;
- receiving an information list and an obstacle-related warning list generated by an obstacle collision prediction and warning device;
- filtering and regrouping via an obstacle filtering device the obstacles of the obstacle list by applying to the obstacles criteria relating:
  - to a proximity of the obstacles relative to the aircraft;
  - to a proximity of the obstacles to one another;
  - to a warning level;

generating a symbology adapted to the obstacle display, wherein the filtering and regrouping step comprises a filtering step, said filtering step comprising the following steps:
- a step of initializing a variable n at the value of the smallest possible position of an obstacle in the list of obstacles filtered according to their elevation;
- a step of extracting an obstacle O(n) whose position in the list of obstacles filtered according to their elevation is equal to n;
- a step of initializing a variable p, fixed at one unit;
- a step of extracting an obstacle O(n+p) whose position in the list of obstacles filtered according to their elevation is equal to n+p,
- a step of comparing a distance d(O(n),O(n+p)) between the obstacle O(n) and the obstacle O(n+p) with the minimum distance D:
  - when the distance d(O(n),O(n+p)) is greater than or equal to the minimum distance D, there is a move to a step of incrementing the index p by a unit;
  - when the distance d(O(n),O(n+p)) is less than the minimum distance D, there is a move to a step of searching.

2. The method as claimed in claim 1, wherein the filtering and regrouping step comprises a step of filtering the obstacles according to elevation in which a list of obstacles filtered according to their elevation is constructed with all the obstacles present in the obstacle list whose elevation is greater than the display threshold received among the information.

3. The method as claimed in claim 2, wherein
- the step of searching in the list of warnings for a warning level A(O(n)) relating to the obstacle O(n) and for a warning level A(O(n+p)) relating to the obstacle O(n+p):
  - when the warning level A(O(n)) is greater than the warning level A(O(n+p)), there is a move to a step of removing the obstacle O(n+p);
  - when the warning level A(O(n)) is less than the warning level O(n+p), there is a move to a step of removing the obstacle O(n);
  - when the warning level A(O(n)) is equal to the warning level A(O(n+p)), there is a move to a step of comparing;
- the step of comparing a horizontal distance d(O(n)) of the obstacle O(n) relative to the aircraft and a horizontal distance d(O(n+p)) of the obstacle O(n+p) relative to the aircraft:
  - when the horizontal distance d(O(n)) is greater than the horizontal distance d(O(n+p)), there is a move to a step of removing the obstacle O(n);
  - when the horizontal distance d(O(n)) is less than the horizontal distance d(O(n+p)), there is a move to a step of removing the obstacle O(n+p);
- the step of removing the obstacle O(n+p) from the filtered obstacle list, the step being followed by the step of incrementing the index p;
- the step of removing the obstacle O(n) from the filtered obstacle list, the step being followed by a step of incrementing the variable n;
- the step of incrementing the variable n by a unit, the step being followed by a step of verifying the existence of the obstacle O(n);
- the step of verifying the existence of the obstacle O(n) in the list of obstacles filtered according to their elevation:
  - when the obstacle O(n) exists, there is again a move to the step of initializing a variable p;
  - when the obstacle O(n) does not exist, there is a move to a step marking the end of the method for filtering according to the proximity of the obstacles;

the filtered obstacle list in the state in which it exists in the step of verifying the existence of the obstacle O(n) is transmitted as a filtered obstacle list.

4. The method as claimed in claim 1, wherein the minimum distance D between two obstacles displayed is computed by dividing a display range relative to the aircraft by a coefficient k.

5. The method as claimed in claim 3, wherein, after the step of extracting the obstacle, a test step is inserted verifying whether an absolute value of the difference between a latitude of the obstacle O(n+p) and a latitude of the obstacle O(n) is less than a minimum distance D:

when it is, there is then a move to the step of comparing the distance d(O(n),O(n+p));

when it is not, there is a move to the step of incrementing the index p.

6. The method as claimed in claim 3, wherein the step of generating the symbology adapted to the display of the obstacles comprises:

a step of processing the display of the obstacle-related warnings, the linear obstacles included in the filtered obstacle list being processed as a list of point-like obstacles, the extremities of the point-like obstacles with which warnings are associated being processed as point-like obstacles having a warning of the same level as the linear obstacle, the obstacle being displayed in the same color as the corresponding terrain warning;

a step of processing the display of the obstacle representation, a different symbol being attached depending on whether the obstacle is a multiple or not.

7. The method as claimed in claim 4, wherein, after the step of extracting the obstacle, a test step is inserted verifying whether an absolute value of the difference between a latitude of the obstacle O(n+p) and a latitude of the obstacle O(n) is less than a minimum distance D:

when it is, there is then a move to the step of comparing the distance d(O(n),O(n+p));

when it is not, there is a move to the step of incrementing the index p.

8. The method as claimed in claim 4, wherein the step of generating the symbology adapted to the display of the obstacles comprises:

a step of processing the display of the obstacle-related warnings, the linear obstacles included in the filtered obstacle list being processed as a list of point-like obstacles, the extremities of the point-like obstacles with which warnings are associated being processed as point-like obstacles having a warning of the same level as the linear obstacle, the obstacle being displayed in the same color as the corresponding terrain warning;

a step of processing the display of the obstacle representation, a different symbol being attached depending on whether the obstacle is a multiple or not.

9. The method as claimed in claim 5, wherein the step of generating the symbology adapted to the display of the obstacles comprises:

a step of processing the display of the obstacle-related warnings, the linear obstacles included in the filtered obstacle list being processed as a list of point-like obstacles, the extremities of the point-like obstacles with which warnings are associated being processed as point-like obstacles having a warning of the same level as the linear obstacle, the obstacle being displayed in the same color as the corresponding terrain warning;

a step of processing the display of the obstacle representation, a different symbol being attached depending on whether the obstacle is a multiple or not.

10. A method for optimizing an obstacle-related data display receiving information necessary to define a zone comprising the obstacles to be displayed, comprising the following steps:

extracting from an obstacle database, a list of obstacles included in a geographic zone defined by a range, the orientation and a position of an aircraft;

receiving an information list and an obstacle-related warning list generated by an obstacle collision prediction and warning device;

filtering and regrouping via an obstacle filtering device the obstacles of the obstacle list by applying to the obstacles criteria relating:

to a proximity of the obstacles relative to the aircraft;

to a proximity of the obstacles to one another;

to a warning level;

generating a symbology adapted to the obstacle display, wherein the filtering and regrouping step comprises a filtering step, said filtering step comprising the following steps:

a step of initializing a variable n at the value of the smallest possible position of an obstacle in the list of obstacles filtered according to their elevation;

a step of extracting an obstacle O(n) whose position in the list of obstacles filtered according to their elevation is equal to n;

a step of initializing a variable p, fixed at one unit;

a step of extracting an obstacle O(n+p) whose position in the list of obstacles filtered according to their elevation is equal to n+p, a step of comparing a distance d(O(n),O(n+p)) between the obstacle O(n) and the obstacle O(n+p) with the minimum distance D:

when the distance d(O(n),O(n+p)) is greater than or equal to the minimum distance D, there is a move to a step of incrementing the index p by a unit;

when the distance d(O(n),O(n+p)) is less than the minimum distance D, there is a move to a step of searching.

11. The method as claimed in claim 10, wherein the filtering and regrouping step comprises a step of filtering the obstacles according to elevation in which a list of obstacles filtered according to their elevation is constructed with all the obstacles present in the obstacle list whose elevation is greater than the display threshold received among the information.

12. The method as claimed in claim 10, wherein said filtering step further comprising the following steps:

the step of searching in the list of warnings for a warning level A(O(n)) relating to the obstacle O(n) and for a warning level A(O(n+p)) relating to the obstacle O(n+p):

when the warning level A(O(n)) is greater than the warning level A(O(n+p)), there is a move to a step of removing the obstacle O(n+p);

when the warning level A(O(n)) is less than the warning level O(n+p), there is a move to a step of removing the obstacle O(n);

when the warning level A(O(n)) is equal to the warning level A(O(n+p)), there is a move to a step of comparing;

the step of comparing a horizontal distance d(O(n)) of the obstacle O(n) relative to the aircraft and a horizontal distance d(O(n+p)) of the obstacle O(n+p) relative to the aircraft:

when the horizontal distance d(O(n)) is greater than the horizontal distance d(O(n+p)), there is a move to a step of removing the obstacle O(n);

when the horizontal distance d(O(n)) is less than the horizontal distance d(O(n+p)), there is a move to a step of removing the obstacle O(n+p);

the step of removing the obstacle O(n+p) from the filtered obstacle list, the step being followed by the step of incrementing the index p;

the step of removing the obstacle O(n) from the filtered obstacle list, the step being followed by a step of incrementing the variable n;

the step of incrementing the variable n by a unit, the step being followed by a step of verifying the existence of the obstacle O(n);

the step of verifying the existence of the obstacle O(n) in the list of obstacles filtered according to their elevation:

when the obstacle O(n) exists, there is again a move to the step of initializing a variable p;

when the obstacle O(n) does not exist, there is a move to a step marking the end of the method for filtering according to the proximity of the obstacles;

the filtered obstacle list in the state in which it exists in the step of verifying the existence of the obstacle O(n) is transmitted as a filtered obstacle list.

13. The method as claimed in claim 10, further comprising:

displaying the two obstacles as one obstacle when the minimum distance D is below a threshold value.

14. The method as claimed in claim 12, wherein, after the step of extracting the obstacle, a test step is inserted verifying whether an absolute value of the difference between a latitude of the obstacle O(n+p) and a latitude of the obstacle O(n) is less than a minimum distance D:

when it is, there is then a move to the step of comparing the distance d(O(n),O(n+p));

when it is not, there is a move to the step of incrementing the index p.

15. The method as claimed in claim 12, wherein the step of generating the symbology adapted to the display of the obstacles comprises:

a step of processing the display of the obstacle-related warnings, the linear obstacles included in the filtered obstacle list being processed as a list of point-like obstacles, the extremities of the point-like obstacles with which warnings are associated being processed as point-like obstacles having a warning of the same level as the linear obstacle, the obstacle being displayed in the same color as the corresponding terrain warning;

a step of processing the display of the obstacle representation, a different symbol being attached depending on whether the obstacle is a multiple or not.

16. The method as claimed in claim 10, wherein, after the step of extracting the obstacle, a test step is inserted verifying whether an absolute value of the difference between a latitude of the obstacle O(n+p) and a latitude of the obstacle O(n) is less than a minimum distance D:

when it is, there is then a move to the step of comparing the distance d(O(n),O(n+p));

when it is not, there is a move to the step of incrementing the index p.

17. The method as claimed in claim 10, wherein the step of generating the symbology adapted to the display of the obstacles comprises:

a step of processing the display of the obstacle-related warnings, the linear obstacles included in the filtered obstacle list being processed as a list of point-like obstacles, the extremities of the point-like obstacles with which warnings are associated being processed as point-like obstacles having a warning of the same level as the linear obstacle, the obstacle being displayed in the same color as the corresponding terrain warning;

a step of processing the display of the obstacle representation, a different symbol being attached depending on whether the obstacle is a multiple or not.

18. The method as claimed in claim 12, wherein the step of generating the symbology adapted to the display of the obstacles comprises:

a step of processing the display of the obstacle-related warnings, the linear obstacles included in the filtered obstacle list being processed as a list of point-like obstacles, the extremities of the point-like obstacles with which warnings are associated being processed as point-like obstacles having a warning of the same level as the linear obstacle, the obstacle being displayed in the same color as the corresponding terrain warning;

a step of processing the display of the obstacle representation, a different symbol being attached depending on whether the obstacle is a multiple or not.

* * * * *